United States Patent
Audet et al.

(10) Patent No.: US 10,706,204 B2
(45) Date of Patent: Jul. 7, 2020

(54) AUTOMATED GENERATION OF SURFACE-MOUNT PACKAGE DESIGN

(71) Applicant: International Business Machines Corporation, Armonk, NY (US)

(72) Inventors: Jean Audet, Granby (CA); Alain Ayotte, Sherbrooke (CA); Franklin Baez, Fishkill, NY (US); Anson Call, Poughkeepsie, NY (US); Deana Cosmadelis, Hopewell Junction, NY (US); Jason Lee Frankel, Wappingers Falls, NY (US); Kevin Grosselfinger, South Burlington, VT (US); Roxan Lemire, Granby (CA); Marek Andrzej Orlowski, Fishkill, NY (US); Gilles Poitras, Granby (CA); Paul Robert Walling, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/149,313

(22) Filed: Oct. 2, 2018

(65) Prior Publication Data
US 2020/0104454 A1 Apr. 2, 2020

(51) Int. Cl.
*G06F 30/398* (2020.01)
*G06F 30/392* (2020.01)

(52) U.S. Cl.
CPC .......... *G06F 30/398* (2020.01); *G06F 30/392* (2020.01)

(58) Field of Classification Search
CPC .. G06F 17/5081; G06F 17/5072; G06F 17/50; G06F 30/398; G06F 30/392
See application file for complete search history.

(56) References Cited

U.S. PATENT DOCUMENTS

| | | | |
|---|---|---|---|
| 5,479,319 A * | 12/1995 | Werther | H05K 1/141 174/260 |
| 6,708,144 B1 | 3/2004 | Merryman et al. | |
| 7,962,886 B1 | 6/2011 | Pandey et al. | |
| 8,327,315 B1 | 12/2012 | Ghosh et al. | |
| 8,516,411 B2 | 8/2013 | Gupta et al. | |
| 8,788,988 B2 | 7/2014 | Reed et al. | |
| 2006/0190116 A1 * | 8/2006 | Almeida | G06F 17/5068 700/102 |
| 2009/0300570 A1 | 12/2009 | Chan | |
| 2010/0049495 A1 | 2/2010 | Francken et al. | |
| 2014/0181770 A1 * | 6/2014 | Ogawa | G06F 17/5068 716/112 |
| 2016/0188773 A1 | 6/2016 | Kang | |

FOREIGN PATENT DOCUMENTS

EP 1873664 A1 1/2008

* cited by examiner

*Primary Examiner* — Vuthe Siek
(74) *Attorney, Agent, or Firm* — Cantor Colburn LLP; Steven Meyers

(57) ABSTRACT

A method of performing automated surface-mount package design includes obtaining physical inputs that include names and locations of top and bottom pins, and obtaining electrical inputs that include electrical parameters such as impedance. The method also includes automatically performing analysis and processing of the physical inputs and the electrical inputs. A design file for manufacture of the surface-mount package is automatically generated based on the performing the analysis and the processing. The design file specifies a number and material of layers of the surface-mount package.

17 Claims, 6 Drawing Sheets

US 10,706,204 B2

AUTOMATED GENERATION OF SURFACE-MOUNT PACKAGE DESIGN

BACKGROUND

The present invention relates to surface-mount packaging, and more specifically, to automated generation of surface-mount package design.

A surface-mount package acts as an interface between an integrated circuit (i.e., chip) and the printed circuit board (PCB) on which the chip is placed. Thus, the surface-mount package is sometimes referred to as a chip interface or chip carrier. An example of a surface-mount package is a flip chip plastic ball grid array (FCPBGA). A surface-mount package can be a single-chip or multi-chip interface. The top pins of the surface-mount package interface with one or more integrated circuits, and the bottom pins of the surface-mount package interface with the PCB.

SUMMARY

Embodiments of the present invention are directed to systems and methods to perform automated surface-mount package design. A method includes obtaining physical inputs that include names and locations of top and bottom pins, and obtaining electrical inputs that include electrical parameters such as impedance. Analysis and processing of the physical inputs and the electrical inputs are automatically performed, and a design file is automatically generated for manufacture of the surface-mount package. The design file specifies a number and material of layers of the surface-mount package.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

As previously noted, a surface-mount package acts as an interface between one or more integrated circuits or chips and the board below (e.g., PCB) that provides mechanical and electrical support. A design file specifies the parameters, connections, and constraints used to manufacture the surface-mount package. While the design file is not new, it is typically generated manually and can take a day or more to generate. Embodiments of the systems and methods detailed herein relate to automated generation of surface-mount package design. The design is then fabricated into the surface-mount package. Physical inputs and electrical inputs are provided for automated inclusion in the design file. In addition, electrical checks are performed without operator intervention prior to providing the design file.

Figure 1:
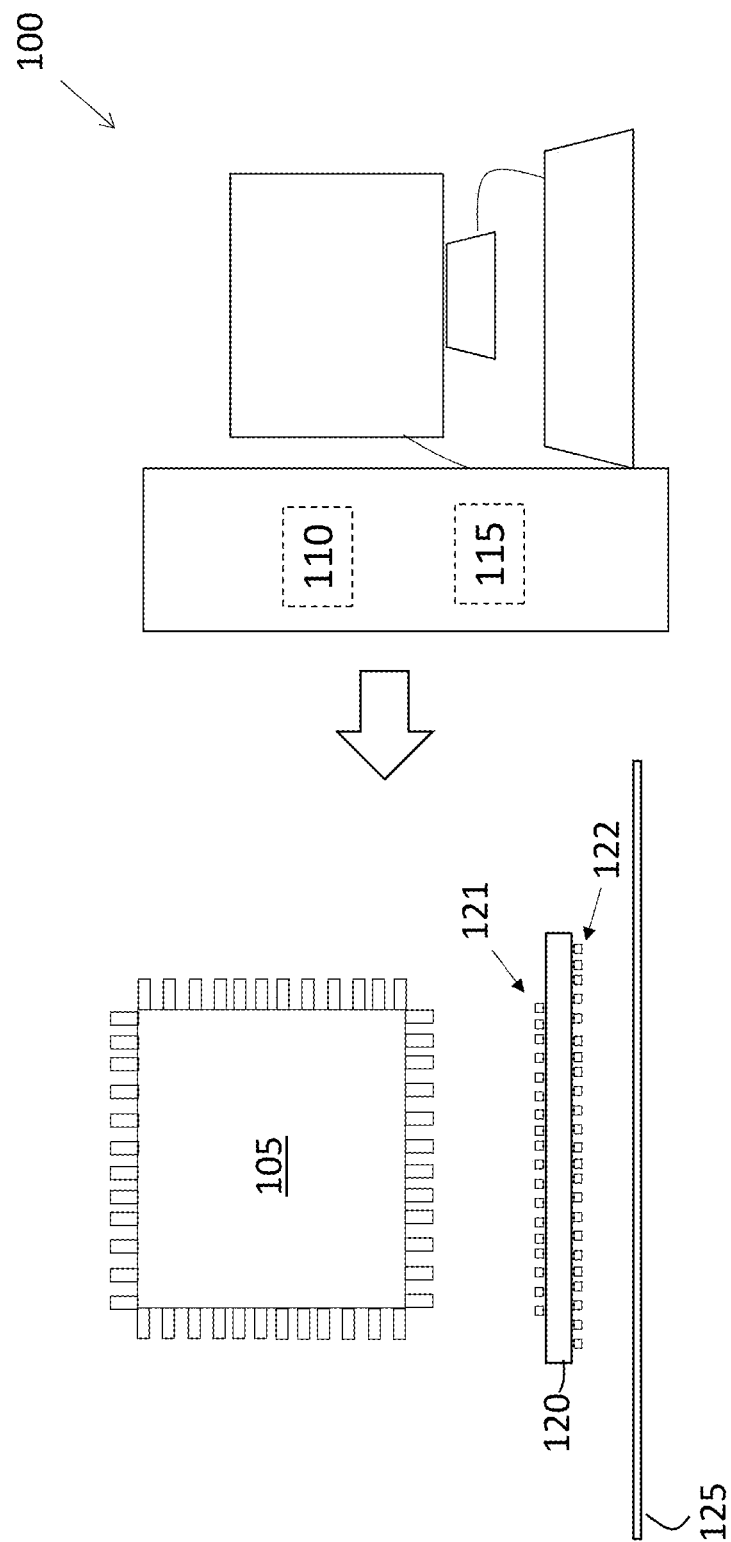
FIG. 1 is a block diagram of a system to perform an automated package design process according to one or more embodiments of the invention.

FIG. 1 is a block diagram of a system 100 to perform automated generation of surface-mount package design according to one or more embodiments of the invention. The system 100 includes processing circuitry 110 and memory 115 that is used to generate the design file that is ultimately fabricated into the surface-mount package 120. A side view of an exemplary surface-mount package 120 and a board 125 (e.g., PCB) on which the surface-mount package 120 can be placed are shown. A top view of an integrated circuit 105 that can be placed on the surface-mount package 120 is also shown. As previously noted, the surface-mount package 120 acts as an interface between the board 125 and the integrated circuit 105, with bottom pins 122 of the surface-mount package 120 connecting to the board 125 and top pins 121 of the surface-mount package 120 connecting to the integrated circuit 105. While only peripheral pins (121, 122) are visible in FIG. 1, each layer typically includes a full array of pins (121, 122). An exemplary surface-mount package 120 can have pins (121, 122) on the order of 20,000 or more. Fabrication of an exemplary surface-mount package 120 is further discussed with reference to FIG. 6.

Figure 2:
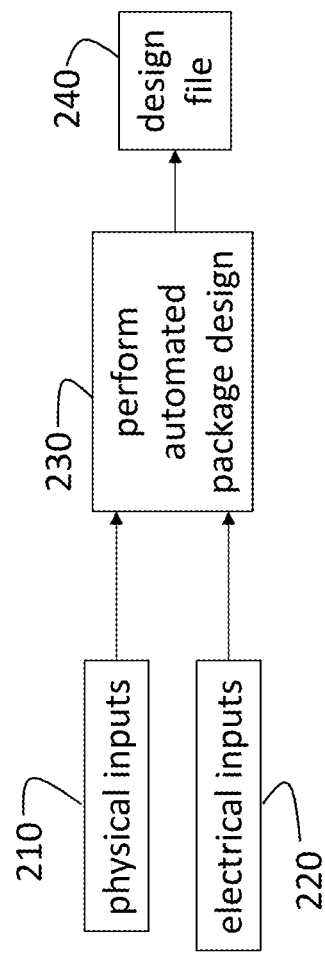
FIG. 2 is a general process flow of an automated package design process according to one or more embodiments of the invention.
Figure 3:
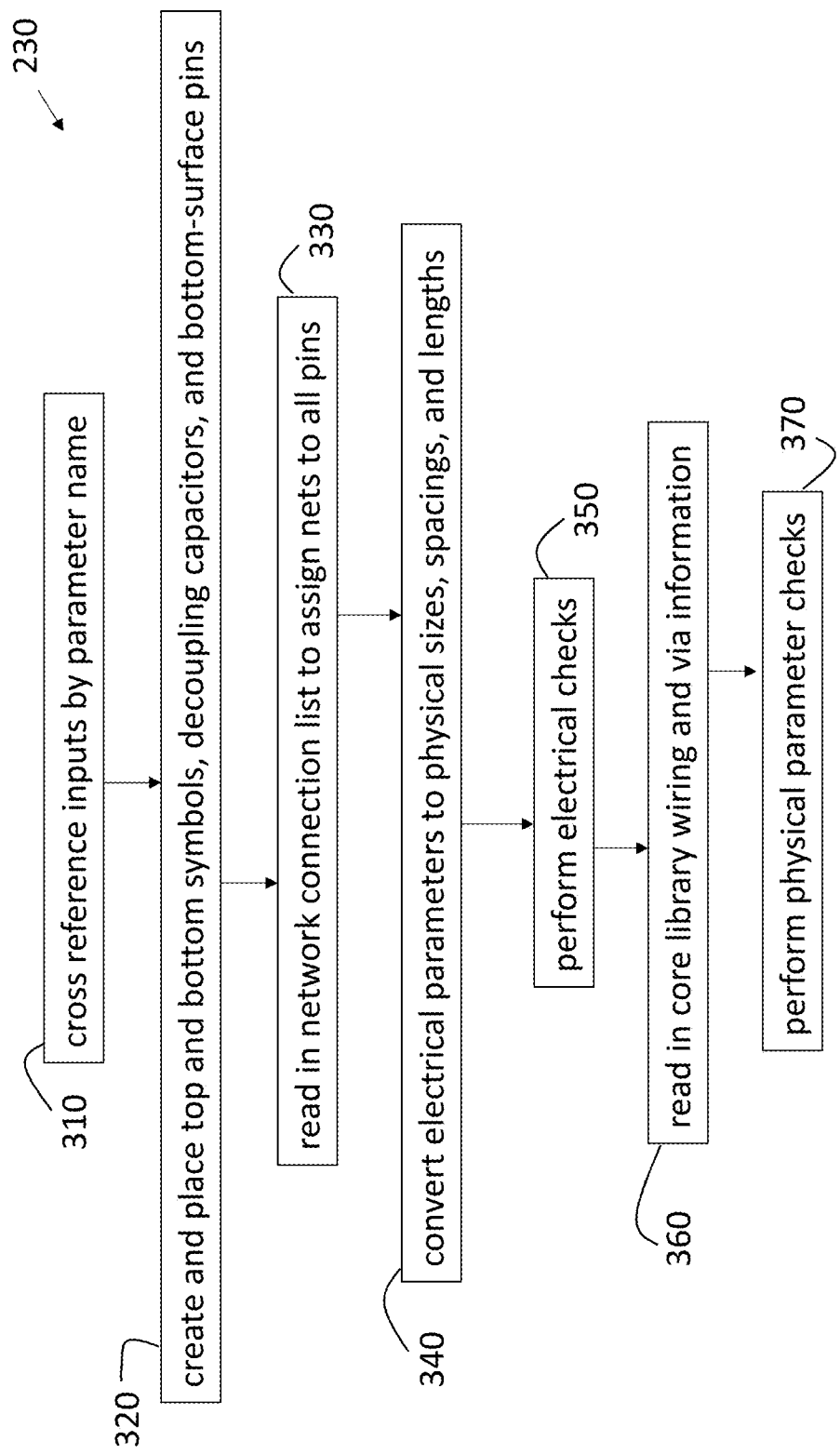
FIG. 3 is an exemplary process flow of a method of performing automated package design according to one or more embodiments of the invention.

FIG. 2 is a general process flow of an automated process for generating a surface-mount package design according to one or more embodiments of the invention. Physical inputs 210 and electrical inputs 220 are provided. At block 230, processes detailed with reference to FIG. 3 are implemented to perform automated surface-mount package design. Performing the automated surface-mount package design, at block 230, results in a design file 240. The design file 240 is in a specific format that facilitates manufacture of the surface-mount package 120. An exemplary format for the design file 240 is the Cadence design format (i.e., Design Exchange Format).

The physical inputs 210 can be provided as a file (e.g., spreadsheet). The physical inputs 210 provided for automated surface-mount package design, at block 230, are not different than the physical inputs 210 provided for manual generation of the design file 240. Some of the inputs include the name and location (e.g., x and y) of the top pins 121 and bottom pins 122, network connections, network parameter names, differential pair identification, bus or group membership information, packaging material (e.g., organic, ceramic), chip technology, package size, diced chip size, core information for pertinent nets (i.e., interconnect specifications) to facilitate subsequent automatic addition of wiring and vias, and decapsulation information (e.g., name, type, location (e.g., x, y)). The electrical inputs 220, like the physical inputs 210, are the same inputs that can be provided for manual package design.

The electrical inputs 220 can include network parameter characteristics (e.g., impedance, maximum delay, frequency, maximum resistance, coupled noise tolerance, reference-above and -below nets, risetime), differential pair parameter characteristics (e.g., bottom-pin-adjacency/neighbor allowance information, coupled noise tolerance, pair impedance, pair impedance tolerance, skew, whether swappable or not), and group parameter characteristics (e.g., level, skew, leading skew, trailing skew, reference net, reference pair). The resulting design file 240 includes information about the pins (121, 122), constraints (e.g., physical constraints), and layers (e.g., number of layers, thicknesses, naming convention of layers, material) so that the surface-mount package 120 can be fabricated.

FIG. 3 is an exemplary process flow of a method of performing automated surface-mount package design, at block 230, according to one or more embodiments of the invention. At block 310, cross referencing inputs by parameter name refers to extracting physical and electrical input information from the files of physical inputs 210 and electrical inputs 220 and identifying parameters that are referenced in both the physical inputs 210 and electrical inputs 220 based on their names. At block 320, the processes include creating and placing top and bottom symbols for the surface-mount package 120, decoupling capacitors, and bottom pins 122. Reading the network connection list, from the physical inputs 210, facilitates assigning nets to all the pins (121, 122) at block 330.

At block 340, the processes include converting electrical parameters from the file of electrical inputs 220 to physical sizes, spacings, and lengths. Performing additional electrical checks, at block 350, is further detailed with reference to FIGS. 4 and 5. At block 360, reading in the core library wiring and via information is optional. This process refers to populating internal wires and relies on the core specification being provided. Performing physical parameter checks, at block 370, prevents, for example, two pins (121, 122) from having the same name.

Figure 4:
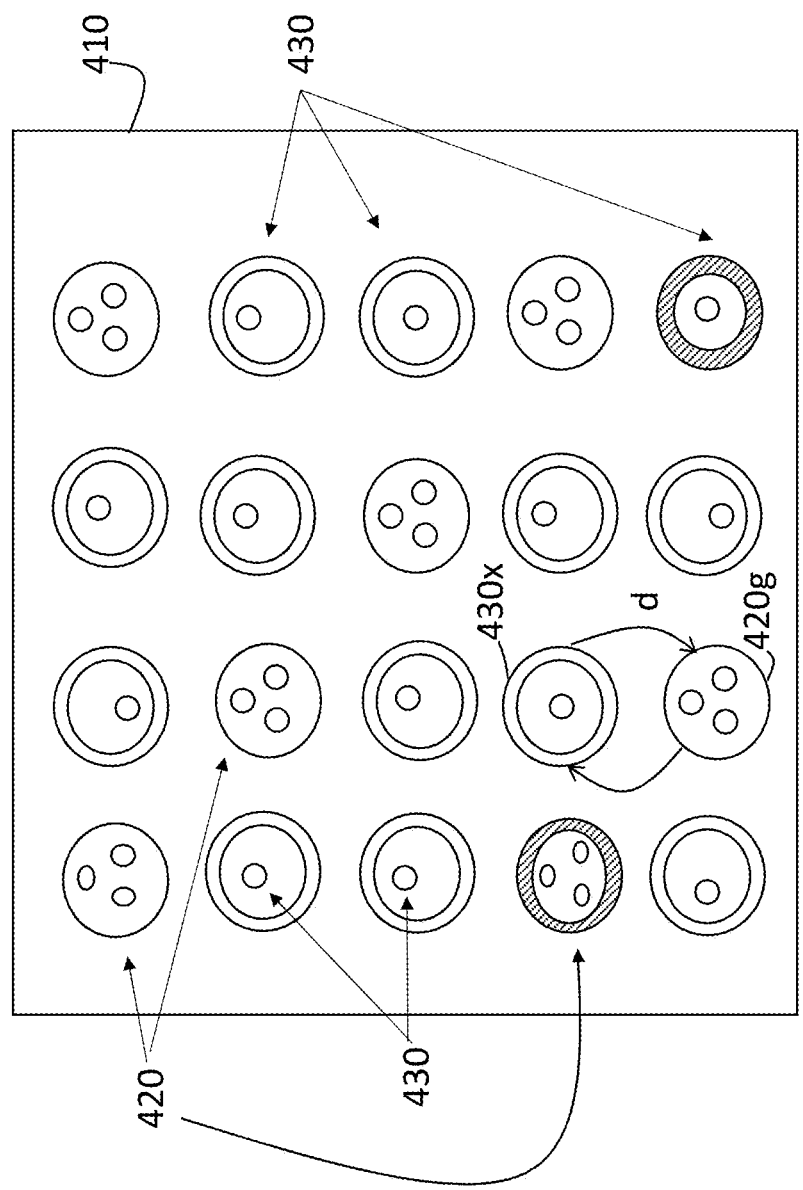
FIG. 4 illustrates an exemplary electrical check performed as part of the process flow of automatically generating the design file according to one or more embodiments of the invention.

The electrical checks, at block 350, refer to four types of checks and can generate four output files for review. While an ordering (e.g., first check, second check) of the checks is referenced for explanatory purposes, the electrical checks can be performed in any order according to alternate embodiments. The first check ensures that all pins are within a requisite distance to the nearest ground pin 420 (FIG. 4). This check is further discussed with reference to FIG. 4. The second electrical check, at block 350, examines the noise associated with pairs of pins 510 (FIG. 5) and is further discussed with reference to FIG. 5. The third electrical check, at block 350, is essentially a sanity check on the electrical inputs 220. The parameters (e.g., resistance) in the electrical inputs 220 are compared to existing standards, which can be derived based on experience and industry knowledge. The output provided based on this check can be a file that lists parameters that are outside their respective standard values. For example, a target resistance for a particular net may be specified as 2.0 while the standard maximum resistance is 1.8. To perform this check, the processing circuitry 110 can compare electrical inputs 220 with a table of standard values according to parameter names, for example. The fourth electrical check, at block 350, pertains to noise sensitivity of nets. Specifically, the check is whether a specified maximum number of adjacent pins that have a given noise requirement is exceeded. An output file can be generated to indicate pins that violate the guidelines associated with low cumulative noise tolerance nets and pairs.

FIG. 4 illustrates an exemplary electrical check performed (at block 350) as part of the process flow of automatically generating the design file 240 according to one or more embodiments of the invention. FIG. 4 shows an exemplary bottom layer 410 with bottom pins 122 specified as ground pins 420 and signal pins 430. An electrical check is performed, at block 350, regarding the round-trip time between each signal pin 430 and the respective nearest ground pin 420. Specifically, that round-trip time must not be less than a specified percentage of the rise time of the signal associated with the signal pin 430. A file may be output, based on the electrical check, of signal pins 430 that violate the check.

For example, the distance d from a signal pin 430x to the nearest ground pin 420g is 3.16 millimeters (mm). Thus, the round-trip distance is double the distance d or 6.32 mm. The time-of-flight of signals is specified as, for example, 6.17 picoseconds (ps)/mm. Thus, the round-trip time between the signal pin 430x and the ground pin 420g is 6.17 ps/mm*6.32 mm (38.9944 ps). The specified percentage of the rise time is, for example, 30 percent, and the rise time for the signal at the signal pin 430x is, for example, 130 ps. Thus, the electrical check would be whether the round-trip time (38.9944 ps) is less than 30 percent of the rise time (39 ps). Because 38.9944, the round-trip time, is less than 39, the specified percentage of the rise time, the signal pin 430x can be indicated in the output file as passing the check.

Figure 5:
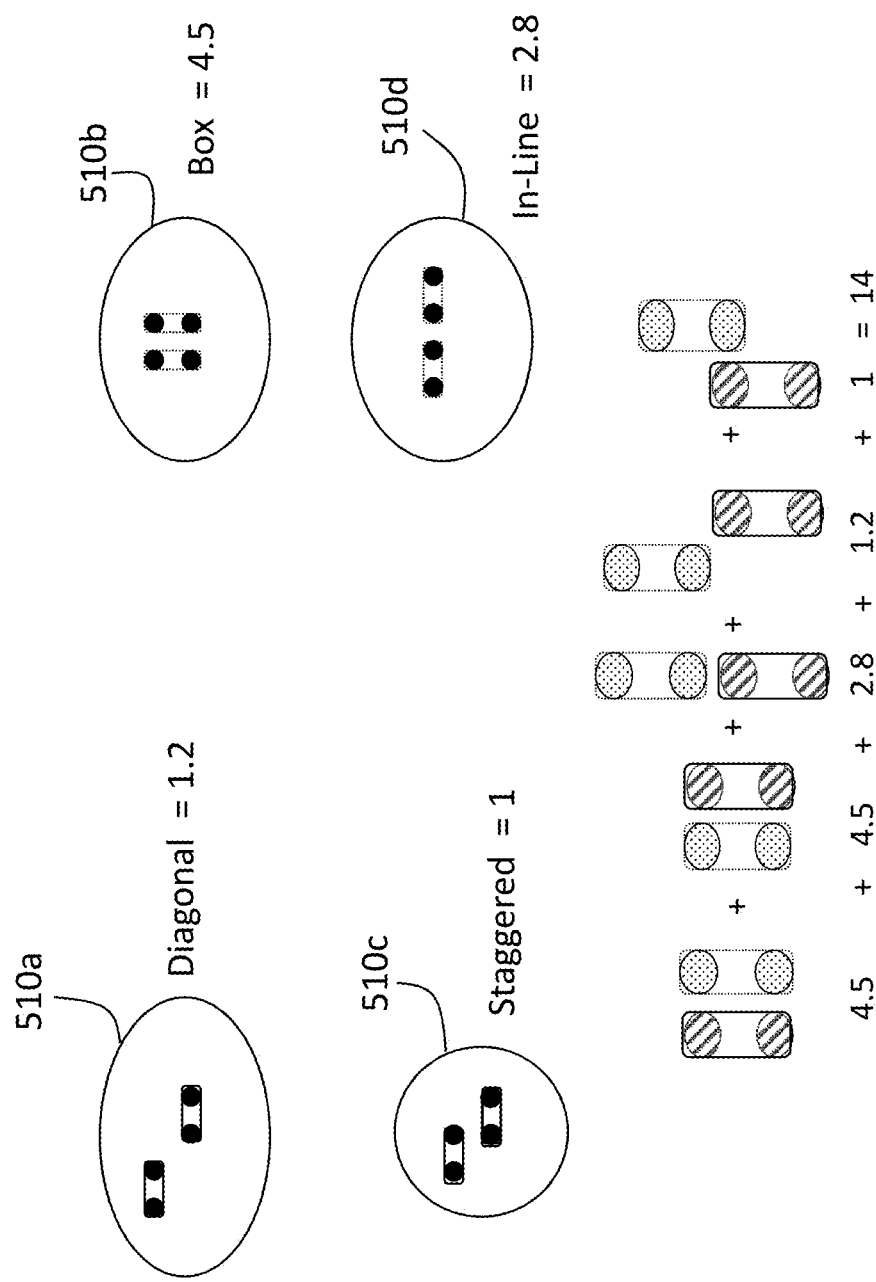
FIG. 5 illustrates information used for a pin pattern placement check as one of the electrical checks according to one or more embodiments of the invention.

FIG. 5 illustrates information used for a pin pattern placement check as one of the electrical checks, at block 350, according to one or more embodiments. This check pertains to the relative arrangement of pairs of pins (121, 122). An exemplary weighting factor used with each type of pin pair 510 is indicated. For example, the weighting factor associated with a diagonal pin pair 510a is 1.2, the weighting factor associated with a side-by-side or box pin pair 510b is 4.5, the weighting factor associated with a staggered pin pair 510c is 1, and the weighting factor associated with an in-line pin pair 510d is 2.8. The weighting factors shown in FIG. 5 are exemplary values. Generally, weighting factors associated with each type of pin pair 510 are specified a priori based on experience and expertise.

An example that uses the exemplary weighting factors is illustrated below the exemplary types of pin pairs 510. A set of pin pairs 510 is shown along with the weighting factor associated with each pin pair 510 based on its type. Lower weighting factor values indicate less noise coupling from aggressors (shown with the diagonal pattern) to victims (shown with the dotted pattern). The weighting factors are summed. In the example shown in FIG. 5, the sum of the weighting factors is 14. This sum is compared with a predefined threshold value, and an error is issued if the sum exceeds the threshold value.

Figure 6:
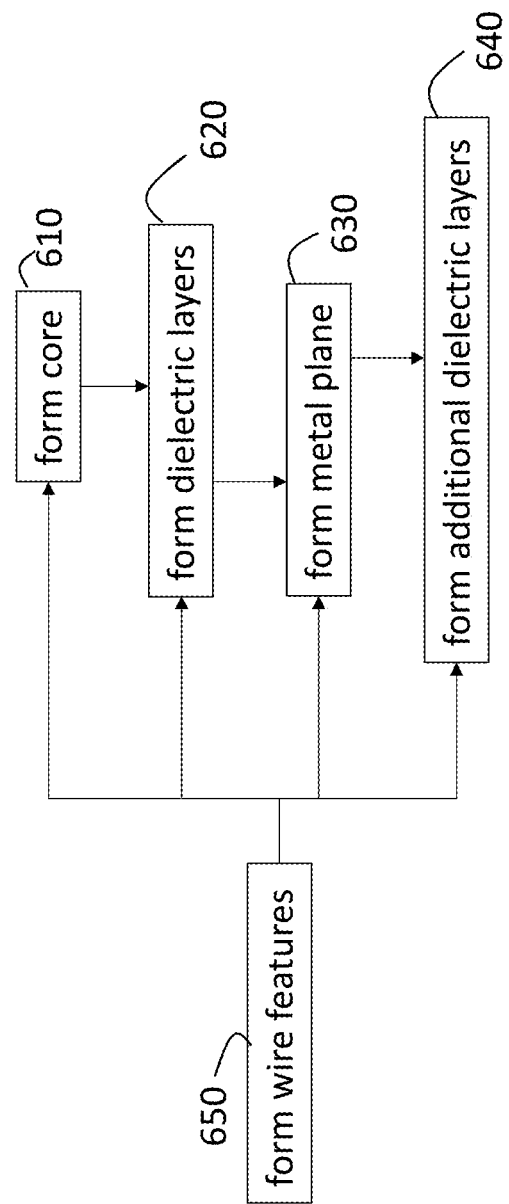
FIG. 6 shows aspects of fabricating a surface-mount package that is designed according to one or more embodiments of the invention.

FIG. 6 is a process flow of fabricating a surface-mount package 120 that is designed according to one or more embodiments of the invention. At block 610, forming a core includes forming one or more core layers. Forming dielectric layers, at block 620, includes forming a first dielectric layer on either side of (e.g., above and below) the core, and forming a metal plane (MP) dielectric layer on each of the first dielectric layers. Forming a MP, at block 630, is on the MP dielectric layer on either side of the core. At block 640, forming additional dielectric layers is also on both sides of the core. The process at block 650, of forming wire features, is part of each of the processes at blocks 610 through 640. That is, one or more core layers, the dielectric layers, and the MP can all be formed with wire features in or on the layers. A wire feature is an electrically conductive structure (e.g., copper) and can include a via that interconnects two layers as well as a wire coplanar with the layer. Wire features on the top and bottom surfaces of the structure that is fabricated according to the processes shown in FIG. 6 are the pins 121, 122. A power or ground plane, which is an electrically conductive structure that provides electric potential or ground to circuits within or attached to the surface-mount package 120, can additionally be formed within one or more of the dielectric layers.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of performing automated surface-mount package design, the method comprising:
    obtaining physical inputs that include names and locations of top and bottom pins;
    obtaining electrical inputs that include electrical parameters including impedance;
    automatically performing, using a processor, analysis and processing of the physical inputs and the electrical inputs, wherein the automatically performing the analysis and the processing includes converting the electrical parameters to physical sizes, spacings, and lengths specified in the design file; and
    automatically generating, using the processor, a design file for manufacture of the surface-mount package based on the performing the analysis and the processing, wherein the design file specifies a number and material of layers of the surface-mount package.

2. The computer-implemented method according to claim 1, wherein the automatically generating the design file includes generating a specified existing format used for manufacture of the surface-mount package.

3. The computer-implemented method according to claim 1, wherein the automatically performing the analysis and the processing includes obtaining a network connection list and assigning interconnect specifications to the top and bottom pins in the design file.

4. The computer-implemented method according to claim 1, wherein the automatically performing the analysis and the processing includes performing electrical checks, and the performing the electrical checks includes ensuring that the electrical parameters at the top and bottom pins are within established standard values and ensuring that a maximum number of adjacent ones of the top or bottom pins with a given noise requirement does not exceed a specified threshold number.

5. The computer-implemented method according to claim 1, wherein the automatically performing the analysis and the processing includes performing electrical checks, and the performing the electrical checks includes ensuring that a round-trip time between a signal pin and a closest ground pin is less than a specified percentage of a rise time of a signal at the signal pin.

6. The computer-implemented method according to claim 1, wherein the automatically performing the analysis and the processing includes performing electrical checks, and the performing the electrical checks includes assigning a weighting factor to each type of pin pair among the top and bottom pins, and ensuring that a sum of the weighting factors of the pin pairs is less than a specified threshold value.

7. A system to perform automated surface-mount package design, the system comprising:
    a memory device configured to store physical inputs that include names and locations of top and bottom pins and electrical inputs that include electrical parameter characteristics including impedance; and
    a processor configured to automatically perform analysis and processing of the physical inputs and the electrical inputs and to automatically generate a design file for manufacture of the surface-mount package based on the performing the analysis and the processing, wherein the design file specifies a number and material of layers of the surface-mount package, and the processor is further configured to convert the electrical parameter characteristics to physical sizes, spacings, and lengths specified in the design file.

8. The system according to claim 7, wherein the processor generates the design file with a specified existing format used for manufacture of the surface-mount package.

9. The system according to claim 7, wherein the processor is further configured to obtain a network connection list and assigns interconnect specifications to the top and bottom pins in the design file.

10. The system according to claim 7, wherein the processor is further configured to perform electrical checks, and the electrical checks include ensuring that the electrical parameters at the top and bottom pins are within established standard values and ensuring that a maximum number of adjacent ones of the top or bottom pins with a given noise requirement does not exceed a specified threshold number.

11. The system according to claim 7, wherein the processor is further configured to perform electrical checks, and the electrical checks include the processor ensuring that a round-trip time between a signal pin and a closest ground pin is less than a specified percentage of a rise time of a signal at the signal pin.

12. The system according to claim 7, wherein the processor is further configured to perform electrical checks, and the electrical checks include the processor assigning a weighting factor to each type of pin pair among the top and bottom pins, and ensuring that a sum of the weighting factors of the pin pairs is less than a specified threshold value.

13. A computer program product for performing automated surface-mount package design, the computer program product comprising a non-transitory computer readable storage medium having program instructions embodied therewith, the program instructions executable by a processor to perform a method comprising:
obtaining physical inputs that include names and locations of top and bottom pins;
obtaining electrical inputs that include electrical parameter characteristics including impedance;
automatically performing analysis and processing of the physical inputs and the electrical inputs, wherein the automatically performing the analysis and the processing includes converting the electrical parameter characteristics to physical sizes, spacings, and lengths specified in the design file; and
automatically generating a design file for manufacture of the surface-mount package based on the performing the analysis and the processing, wherein the design file specifies a number and material of layers of the surface-mount package.

14. The computer program product according to claim 13, wherein the automatically generating the design file includes generating a specified existing format used for manufacture of the surface-mount package.

15. The computer program product according to claim 13, wherein the automatically performing the analysis and the processing includes obtaining a network connection list and assigning interconnect specifications to the top and bottom pins in the design file.

16. The computer program product according to claim 13, wherein the automatically performing the analysis and the processing includes performing electrical checks including ensuring that the electrical parameters at the top and bottom pins are within established standard values and ensuring that a maximum number of adjacent ones of the top or bottom pins with a given noise requirement does not exceed a specified threshold number.

17. The computer program product according to claim 13, wherein the automatically performing the analysis and the processing includes performing electrical checks including ensuring that a round-trip time between a signal pin and a closest ground pin is less than a specified percentage of a rise time of a signal at the signal pin and assigning a weighting factor to each type of pin pair among the top and bottom pins, to ensure that a sum of the weighting factors of the pin pairs is less than a specified threshold value.

* * * * *